US008806589B2

(12) United States Patent
Subramanya et al.

(10) Patent No.: US 8,806,589 B2
(45) Date of Patent: Aug. 12, 2014

(54) CREDENTIAL COLLECTION IN AN AUTHENTICATION SERVER EMPLOYING DIVERSE AUTHENTICATION SCHEMES

(75) Inventors: Ramya Subramanya, Bangalore (IN); Aarathi Balakrishnan, Bangalore (IN); Vikas Pooven Chatoth, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 109 days.

(21) Appl. No.: 13/526,563

(22) Filed: Jun. 19, 2012

(65) Prior Publication Data

US 2013/0340054 A1 Dec. 19, 2013

(51) Int. Cl.
*G06F 21/00* (2013.01)

(52) U.S. Cl.
USPC ............................ 726/5; 726/6; 726/7; 726/8

(58) Field of Classification Search
USPC ............................................................ 726/5
See application file for complete search history.

(56) References Cited

U.S. PATENT DOCUMENTS

| | | | |
|---|---|---|---|
| 6,697,811 B2 | 2/2004 | Brodsky | |
| 7,231,661 B1 * | 6/2007 | Villavicencio et al. | 726/4 |
| 7,698,735 B2 * | 4/2010 | Dujari et al. | 726/8 |
| 7,730,410 B2 | 6/2010 | Goering | |
| 7,765,585 B2 * | 7/2010 | Chao et al. | 726/5 |
| 8,276,190 B1 * | 9/2012 | Chang et al. | 726/3 |
| 8,561,152 B2 * | 10/2013 | Novak et al. | 726/4 |
| 2007/0143829 A1 * | 6/2007 | Hinton et al. | 726/5 |
| 2007/0174905 A1 * | 7/2007 | Martherus et al. | 726/8 |
| 2007/0233540 A1 | 10/2007 | Sirota | |
| 2007/0289009 A1 * | 12/2007 | Phan-Anh | 726/12 |
| 2008/0033966 A1 * | 2/2008 | Wahl | 707/10 |
| 2008/0271121 A1 | 10/2008 | Hinton et al. | |
| 2009/0219830 A1 * | 9/2009 | Venner et al. | 370/254 |
| 2010/0048170 A1 | 2/2010 | Jewsbury et al. | |
| 2011/0202988 A1 * | 8/2011 | Otranen et al. | 726/8 |
| 2012/0102554 A1 * | 4/2012 | Emerick et al. | 726/6 |
| 2012/0278311 A1 * | 11/2012 | Dettinger et al. | 707/722 |

OTHER PUBLICATIONS

"Tivoli Access Manager" "Tivoli Access Manager Plug-In for Web Servers Authentication" "http://publib.boulder.ibm.com/infocenter/tivihelp/v2r1/index.jsp?topic=%2Fcom.ibm.itame2.doc_5.1%2Fam51_webservers_guide26.htm", Downloaded circa Feb. 21, 2012, pp. 1-1.
"Developer Works" "Two-Factor Authentication Using Tivoli Access Manager Webseal" "http://www.ibm.com/developerworks/tivoli/library/t-webseal/", Published on May 1, 2003, pp. 1-9.

(Continued)

*Primary Examiner* — William Powers
*Assistant Examiner* — Yonas Bayou
(74) *Attorney, Agent, or Firm* — Narendra Reddy Thappeta (57) ABSTRACT

An aspect of the present invention facilitates flexible credential collection in an authentication server employing diverse authentication schemes. In an embodiment, an access manager in the authentication server determines that an authentication scheme is to be used for allowing access to a resource requested by a user. A custom module (implementing the authentication scheme) in the authentication server then sends to the access manager commands indicating corresponding sets of credentials to be collected. The access manager, in response to receiving each command, collects the corresponding credentials from the user and checks whether the collected credentials authenticates the user. The custom module sends each command after the checking of the previously collected credentials. Accordingly, a developer of the custom module is enabled to request for and to perform the authentication of the user based on different sets of credentials.

17 Claims, 5 Drawing Sheets

(56) References Cited

OTHER PUBLICATIONS

"Oracle Blog" "Access Manager Authentication Module and UI 101" "https://blogs.oracle.com/validhandle/entry/access_manager_authentication_module_and, Downloaded circa Feb. 21, 2012", pp. 1-8.

"Approva Corporation" "Access Manager for SAP" "http://www.consider.biz/attachments/Compliant%20User%20Access%20Provisioning%20and%20Emergency%20Access%20Management%20for%20SAP.pdf", Copyright 2009, p. 1-2.

"Novell" "Simple, Secure Access to Network Resources" http://www.novell.com/docrep/2008/11/Novell_Access_Manager_Business_White_Paper_en.pdr, Copyright 2008, p. 1-8.

"Microsoft Forefront" "Business-Ready Security—Identity and Access Management Solution" "http://download.microsoft.com/download/2/E/5/2E5076F4-3496-4242-B7FA-B4E5A27708AD/Identity_and_Access_Management_Datasheetpdf", Copyright 2009, p. 1-2.

"Oracle® Fusion Middleware" "Oracle Fusion Middleware Developer'S Guide for Oracle Access Manager and Oracle Security Token Service 11G Release 1 (11.1.1)" "http://docs.oracle.com/cd/E21764_01/doc.1111/e12491/toc.htm", Copyright 2009, p. 1-114.

\* cited by examiner

CREDENTIAL COLLECTION IN AN AUTHENTICATION SERVER EMPLOYING DIVERSE AUTHENTICATION SCHEMES

BACKGROUND

1. Technical Field

The present disclosure relates to authentication systems and more specifically to credential collection in an authentication server employing diverse authentication schemes.

2. Related Art

Authentication refers to confirming whether a user is who s/he purports to be. In computing systems, authentication is used as a basis for granting access to various resources, as is well known in the relevant arts. Authentication servers are often used for authenticating users, prior to providing access to resources, as is also well known in the relevant arts.

Credentials are often used for authentication of users. Credentials refer to various inputs from/of (specific to) the user, which are processed for authenticating users. Examples of credentials include user identifier (e.g., login name, email identifier), password, image (of face, thumb-print, etc.), voice, content of an electronic file (e.g., representing a digital certificate), etc. An authentication server may collect the desired credentials, as suited for corresponding situations, from a user and authenticate the user based on the received credentials.

Authentication servers are designed to operate based on various authentication schemes. Each authentication scheme generally specifies a corresponding set of credentials to be collected, and the manner (processing) in which authentication is to be performed using such collected credentials. For example, one common scheme specifies that a combination of user identifier and password is to be collected from a user, and compared with corresponding values in a non-volatile storage. The user is authenticated under the assumption that knowledge of the combination confirms the identity of the user.

Diverse authentication schemes are often employed in a single authentication server. Such a requirement is often present in complex environments for reasons such as one or more of the nature of resources accessible by users, diversity of user applications supported in the computing environment, or different levels of security desirable for different resources/users, etc.

It is generally desirable to have flexible credential collection mechanisms, for example, to simplify implementation of additional diverse authentication schemes, as may be required in the corresponding environments.

BRIEF DESCRIPTION OF THE DRAWINGS

Example embodiments of the present invention are described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention facilitates flexible credential collection in an authentication server employing diverse authentication schemes. In an embodiment, an access manager in the authentication server determines that a first authentication scheme is required to be used for allowing access to a resource requested by a user. A custom module in the authentication server (implementing the first authentication scheme, and upon being notified by an appropriate mechanism) then sends to the access manager a first command indicating a first set of credentials to be collected.

The access manager, in response to receiving of the first command collects the first set of credentials from the user, and checks whether the first set of credentials authenticates the user. The custom module then sends to the access manager a second command after the checking (of the first set of credentials), the second command indicating a second set of credentials to be collected. The access manager, in response to receiving of the second command, collects the second set of credentials from the user and checks whether the second set of credentials authenticates the user.

In one embodiment, the access manager sends the collected first and second set of credentials to the custom module. The custom module, in response to receiving each of first and second sets of credentials, determines whether the respective set of credentials authenticate the user, and sends a respective status of authentication to the access manager. The status of authentication is either the second command (noted above) or a result (success or failure) of authentication.

Thus, a developer of the custom module is enabled to request for different sets of credentials from the user and to perform the authentication of the user based on the inputs received (from the user) corresponding to the different sets of credentials. Such ability facilitates the developer to implement any desired/complex authentication scheme in the authentication server.

According to another aspect of the present invention, the access manager is designed to support a set of commands including the first command and the second command (noted above), but not another (third) command. A credential collection module, provided in authentication server, is designed to collect a third set of credentials in response to another command. Accordingly, in response to receiving another command from the custom module, the access manager interfaces with the credential collection module for collecting the third set of credentials. As a result, the authentication server operates to support the new/unknown commands (such as another command) without having to modify the program logic of the access manager.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
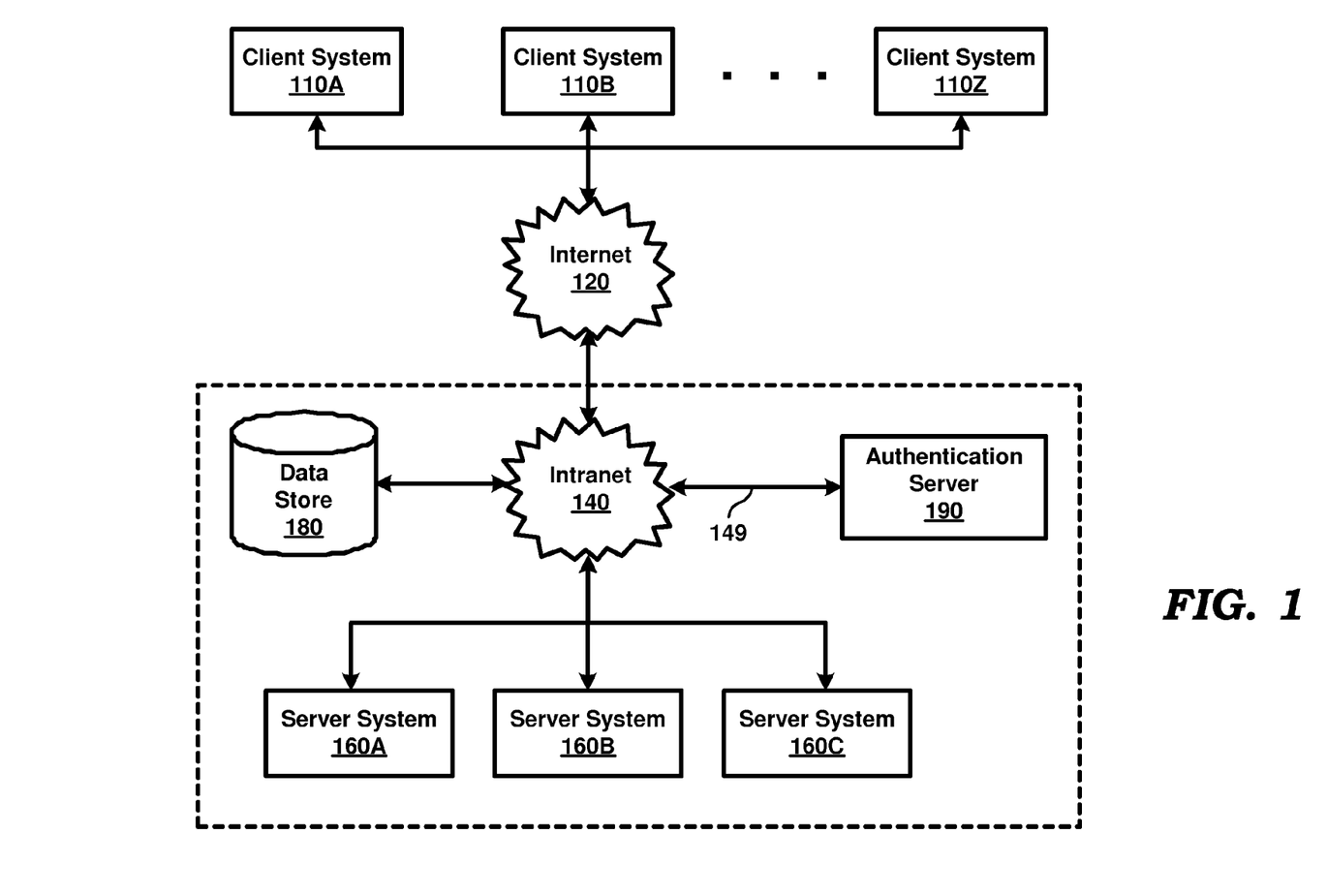
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing client systems 110A-110Z, Internet 120, intranet 140, server systems 160A-160C, data store 180 and authentication server 190.

Merely for illustration, only representative number/type of systems is shown in FIG. 1. Many environments often contain many more systems, both in number and type, depending on the purpose for which the environment is designed. Each block of FIG. 1 is described below in further detail.

Intranet 140 represents a network providing connectivity between server systems 160A-160C, data store 180, and authentication server 190, all provided within an enterprise or domain (shown with dotted boundaries). Internet 120 extends the connectivity of these (and other systems of the enterprise) with external systems such as client systems 110A-110Z. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by intranet 140 and Internet 120.

Data store 180 represents a non-volatile (persistent) storage facilitating storage and retrieval of a collection of data by applications executing in server systems 160A-160C (and also authentication server 190). Data store 180 may be implemented as a database server using relational database technologies and accordingly provide storage and retrieval of data using structured queries such as SQL (Structured Query Language). Alternatively, data store 180 may be implemented as a file server providing storage and retrieval of data in the form of files organized as one or more directories, as is well known in the relevant arts.

Each of client systems 110A-110Z represents a system such as a personal computer, workstation, mobile device, etc., used to access various resources (such as data and/or applications) provided within or external to the computing system of FIG. 1. The resources may be accessed based on requests generated by client applications, such as a browser (or other custom applications), executing in the client system (in response to a user interaction). In response to sending the requests, the client system receives the corresponding responses (e.g., web pages), as implemented in the corresponding environment. The web pages/responses may then be presented to the user by the client applications such as the browser.

Each of server systems 160A-160C represents a server, such as a web/application server, capable of hosting resources and thereafter providing access to the hosted resources in processing corresponding requests received from client systems 110A-110Z. Some of the resources on each server may be "protected" resources such that authentication is required, before a user (from one of client systems 110A-110Z) can access the corresponding resources. In one embodiment, server systems 160A-160C is designed to operate with an authentication server (190) for performing authentication of the users.

Authentication server 190 represents a system such as a server, which authenticates users attempting to access resources hosted on server systems 160A-160C. An example of an authentication server is Oracle Access Manager 11G available from Oracle Corporation, the intended assignee of the present disclosure. However, the features of the invention can be implemented in other authentication servers, from other vendors as well. Once a user is authenticated, the user may access the resources, for example, using the appropriate web pages.

Authentication server 190 may accordingly be implemented to employ diverse authentication schemes, due to the complexity of the resources hosted by server systems 160A-160C, the diversity of user applications supported in the computing environments of the enterprise, resources/users, etc. The manner in which authentication server 190 may be implemented to support diverse authentication schemes is described below with examples.

3. Employing Diverse Authentication Schemes

Figure 2:
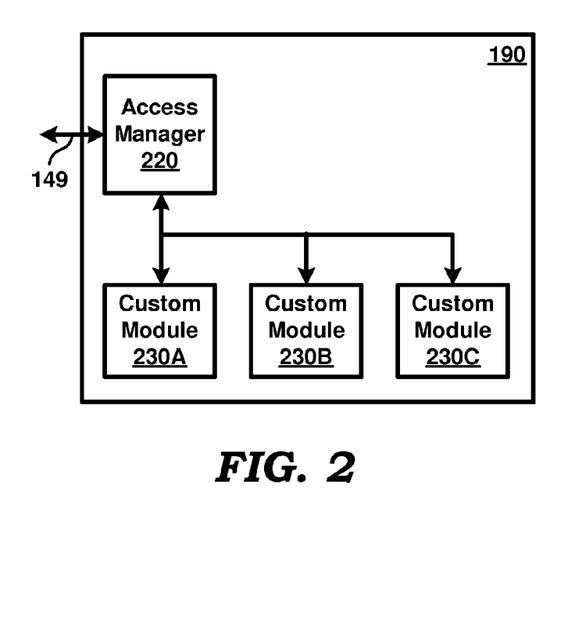
FIG. 2 is a block diagram illustrating the manner in which an authentication server employing diverse authentication schemes is implemented in one embodiment.

FIG. 2 is a block diagram illustrating the manner in which an authentication server (190) employing diverse authentication schemes is implemented in one embodiment. Authentication server 190 is shown containing access manager 220, and custom modules 230A-230C. Each of the systems/blocks of FIG. 2 is described in detail below.

Access manager 220 receives (via path 149) and processes authentication requests from server systems 160A-160C (in response to resource access requests from users using client systems 110A-110Z). In particular, in response to an authentication request for a user seeking access to a resource, access manager 220 determines the specific authentication scheme to be employed based on the information on the user (such as the access level, the authorizations, etc.) and the resource (the criticality, the location, the protocol user to access, etc.) For example, the determination may be based on rules specified by an administrator of the enterprise. In addition or in the alternative, the authentication scheme corresponding to different combinations of users and resources may be determined based on configuration data maintained in data store 180.

After identifying that a specific authentication scheme is to be used, access manger 220 collects credentials from the user (for example, by sending appropriate web pages to the requesting client system) corresponding to the identified authentication scheme. Access manager 220 then performs authentication of the user based on the manner (process) specified by the specific authentication scheme and the collected credentials. For example, access manager 220 may collect a user name and password from the user and then compare the corresponding values in a non-volatile storage such as data store 180 (with a match indicating successful authentication). The result of the authentication (for example, the comparison noted above) is then sent as a response to the authentication request to the requesting server system.

It may be appreciated that access manager 220 may be shipped with (built-in) implementations of specific set of pre-defined authentication schemes. It may be desirable that authentication server 190 support additional authentication schemes, for example, for appropriate access of new resources deployed in the enterprise.

Custom modules 230A-230C represent corresponding additional (or customized) authentication schemes (to be) employed by authentication server (190). The custom modules may be integrated into authentication server 190 based on a plug-in architecture. In general, plug-in architectures provide a common interface to be implemented by each of the plug-ins (custom modules). By using plug-in architecture, developers can create and integrate new authentication schemes (with corresponding modules implementing the requisite common interface) into the authentication server. An example plug-in framework provided by Oracle Access Manager 11G is described in detail in the document entitled "Oracle Fusion Middleware Developer's Guide for Oracle Access Manager and Oracle Security Token Service 11g Release 1 (11.1.1)" available from Oracle Corporation.

It may be appreciated that each custom module is designed to accept a pre-defined (potentially different) set of credentials and to perform a corresponding manner of authentication with the credentials. Accordingly, in response to identifying that an authentication scheme implemented by a specific custom module is to be used, access manager 220 is designed to first collect the pre-defined credentials for the specific custom module and then to invoke (according to the common interface specified by the plug-in framework) the specific custom module with the collected credentials. Access manager 220 receives the result of authentication as the response to invocation and then forwards the result to the appropriate server system.

It may be appreciated that some of the new custom modules may operate with credentials that are not inputs to any previously deployed (built-in or integrated) modules. In some other scenarios, credential collection may be required be performed using different protocols (e.g., (such as HTTP, WAP, etc.), not already implemented by access manager 220.

A prior approach to implementing such new custom modules entails modifying the software instructions constituting access manager 220. Such a modification may be undesirable at least since the source code of the shipped access manager may not be available to the developers of the custom modules. Several aspects of the present invention provide more flexible credential collection mechanisms that simplify integration of additional/diverse authentication schemes, as described below with examples.

4. Providing Flexible Credential Collection

Figure 3:
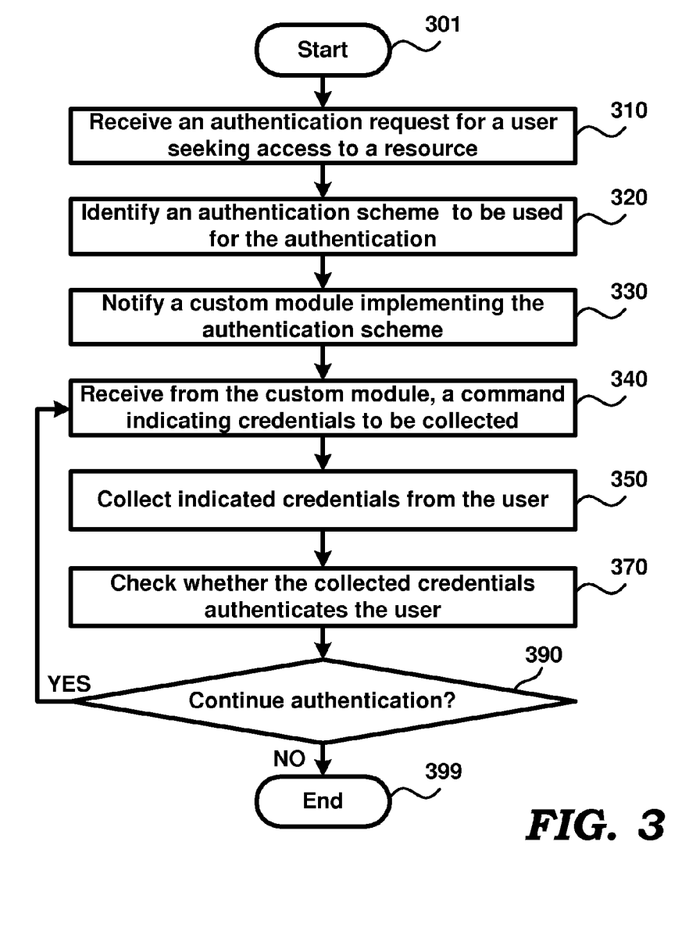
FIG. 3 is a flow chart illustrating the manner in which credential collection in an authentication server employing diverse authentication schemes is performed according to an aspect of the present invention.

FIG. 3 is a flow chart illustrating the manner in which credential collection in an authentication server employing diverse authentication schemes is performed according to an aspect of the present invention. The flowchart is described with respect to FIGS. 1 and 2 merely for illustration. However, many of the features can be implemented in other environments (and using potentially other types of systems/servers) also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 310.

In step 310, access manager 220 receives an authentication request for a user seeking access to a resource. Such an authentication request may be received from one of server systems 160A-160C while processing a resource access requested received from a client system (110A-110Z) used by the user.

In step 320, access manager 220 identifies an authentication scheme to be used for the authentication. Such identification may be performed, for example, based on configuration data (maintained in data store 180) and/or rules (specified by an administrator), as described with respect to FIG. 2.

In step 330, access manager 220 notifies a custom module (e.g., 230B) implementing the authentication scheme. Such notification may entail invoking a common interface implemented by the custom module according to the plug-in framework, or passing of an appropriately encoded message according to a pre-specified convention, etc.

In step 340, access manager 220 receives from custom module 230B, a command indicating credentials to be collected. In an embodiment, each command for a corresponding set of credentials is specified by a corresponding text/string. Thus, the received text/string indicates the specific credentials to be collected.

In step 350, access manager 220 may collect the indicated credentials from the user. Such collection can be according to any suitable user interface, as suited for the specific set of credentials and/or environment.

In step 370, access manager 220 checks whether the collected credentials authenticates the user. Such checking entails sending the collected credentials to custom module 230B, and awaiting a status of authentication from custom module 230B. The status can either be a result (success or failure) of authentication or a next command (indicating the next set of credentials to be collected).

In step 390, access manager 220 determines whether authentication is to be continued, based on the received status. In the scenario that a next command is received (indicating that authentication is to be continued), control passes to step 340. If the result of authentication is received (indicating completion of performance of the authentication scheme for this user), control passes to step 399, where the flow chart ends.

It may thus be appreciated that a custom module issues a next command, only after processing of the previously collected credentials. The custom module may accordingly be designed to request different additional credentials, based on the authentication processing of the previously collected credentials. Such a feature facilitates collection of credentials for implementing complex authentication schemes.

In addition, the software instructions constituting access manager 220 may be left unchanged when deploying new custom modules implementing corresponding new authentication schemes, at least when the commands are pre-specified and supported by access manager 220. However, configuration data (described above) indicating the specific custom module to be invoked (for user-resource combinations) may need to be updated, when a new custom module is added.

An aspect of the present invention enables new commands also to be supported, without requiring changes to software instructions constituting access manager 220, as described below with examples.

5. Supporting New Commands

Figure 4A:
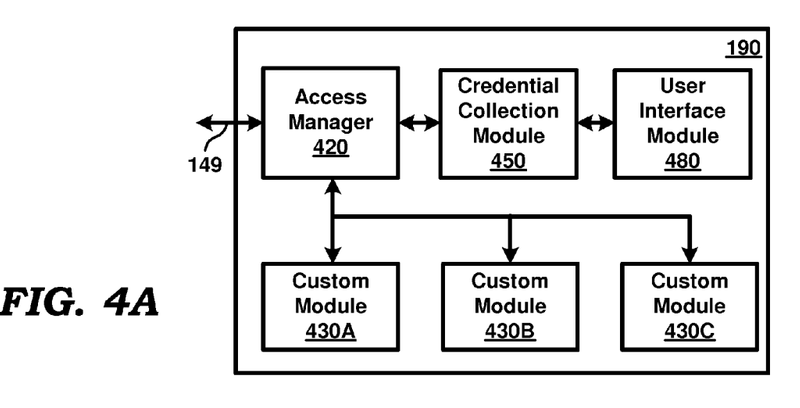
FIG. 4A is a block diagram illustrating the manner in which an authentication server supporting new commands is implemented in one embodiment.

FIG. 4A is a block diagram illustrating the manner in which an authentication server (190) supporting new commands is implemented in one embodiment. Authentication server 190 is shown containing access manager 420, custom modules 430A-430C, credential collection module 450 and user interface module 480. Each of the systems/blocks of FIG. 4 is described in detail below.

Custom modules 430A-430C operate similar to custom modules 230A-230C, in issuing commands (indicating corresponding set of credentials) to be collected to access manager 420, receiving the collected credentials from access manager 420, checking whether the received credentials authenticates the user and then sending a status of authentication (a result of authentication or a next command) to access manager 420.

Access manager 420 operates similar to access manager 220 in receiving (via path 149) and processing authentication requests by determining the authentication scheme to be used, invoking the corresponding custom module, receiving commands from the invoked custom module, collecting the sets of credentials corresponding to the commands from the user, and checking, by using the custom module, whether the collected credentials authenticate the user. As noted above, access manager 420 supports a pre-defined set of commands, and is implemented to collect a corresponding pre-defined set of credentials corresponding to each supported command.

According to an aspect of the present invention, access manager 420 is designed to forward new/unknown command to credential collection module 450, when a command received from a custom module (e.g. 430C) is not contained in the supported set of commands. Credential collection module 450 is designed to receive (new/unknown) commands, identify the corresponding set of credentials to be collected and then interact with the user (for example, by sending appropriate web pages) for collecting the identified set of credentials. Credential collection module 450 then provides the collected credentials to access manager 420 to facilitate the interactions with the custom module (430C).

Accordingly, in response to a sequence of new commands from a custom module (430C), access manager 420 iteratively performs the actions of sending each new command to credential collection manager 450, receiving the collected credentials from credential collection manager 450 and then forwarding the received credentials to the custom module (430C). As such, access manager 420 acts merely as a "router" for new/unknown commands.

It should be appreciated that by implementing credential collection module 450 external to (and separate from) access manager 420, developers of custom modules are facilitated to implement appropriate credential collection modules (though only one is shown in FIG. 4, for conciseness) supporting various new sets of commands. For example, a credential collection module may be designed to operate with a new protocol (such as mobile protocols) in response to a specific command, and the custom modules may perform operations with the new protocol by sending the specific command to access manager 420.

Accordingly, the software instructions constituting access manager 420 may be left unchanged when deploying new custom modules implementing corresponding new authentication schemes using protocols not already implemented by access manager 420.

An aspect of the present invention facilitates a developer to create and deploy a (custom) user interface module (such as 480) providing the specific user interface elements (e.g. a web page) to be used for collecting the credentials. The developer may modify a configuration data to indicate that user interface module 480 is to be used, in response to a corresponding command. Accordingly, custom credential collection module 450, in response to receiving the corresponding command, invokes user interface module 480, receives the user interface elements (web page) from user interface module 480 and then forwards the received user interface elements to the user (for receiving the credentials).

Accordingly, several flexible credential collection mechanisms are made available to developers, thereby simplifying implementation of additional authentication schemes, as may be required in the computing system of FIG. 1.

Figure 4B:
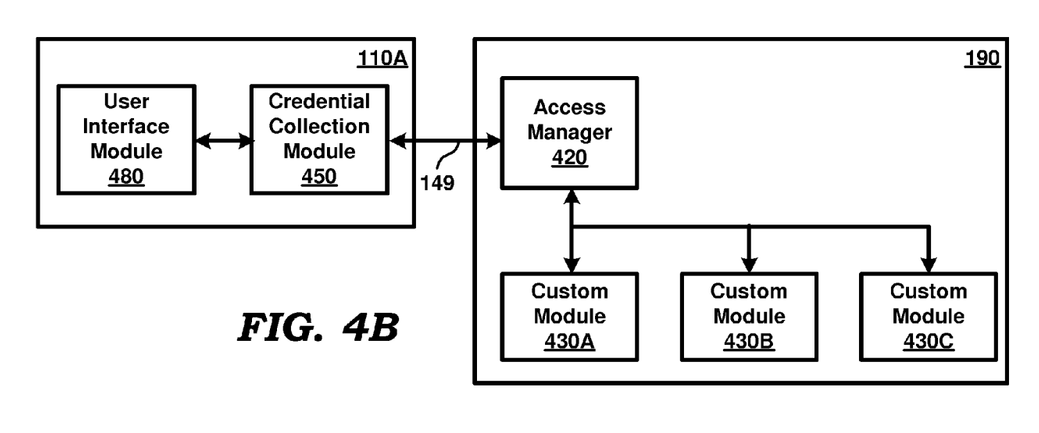
FIG. 4B is a block diagram illustrating the manner in which an authentication server supporting new commands is implemented in another embodiment.

It may be appreciated that in alternative embodiments, credential collection module 450 and user interface module 480 may be implemented external to authentication server 190. FIG. 4B is a block diagram that illustrates the implementation of an authentication server supporting new commands in one alternative embodiment. In FIG. 4B, credential collection module 450 and user interface module 480 are shown implemented in client system 110A (for example, a mobile device). Thus, developers are facilitated to implement more flexible credential collection mechanisms.

The manner in which such flexible credential collection mechanisms may be implemented for protecting resources using a new authentication scheme is described below with examples, in particular in the context of processing a request for such protected resources.

6. Processing a Access Request

Figure 5:
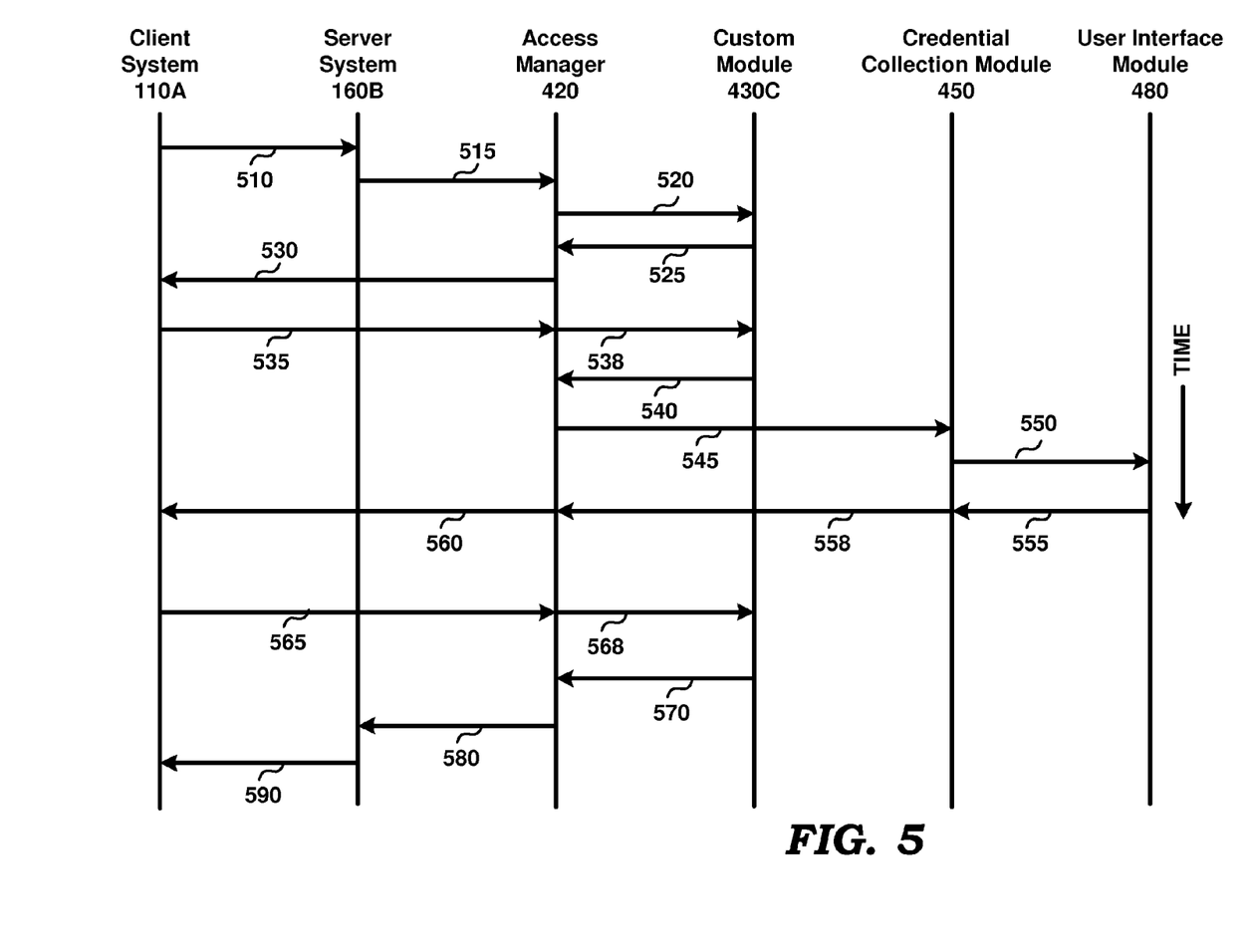
FIG. 5 is a sequence diagram illustrating the manner in which an access request for a resource protected by a new authentication scheme is processed in one embodiment.

FIG. 5 is a sequence diagram illustrating the manner in which an access request for a resource protected by a new authentication scheme is processed in one embodiment. The description is continued assuming that access manager 420 is designed to support the following set of commands: CMD_USER_PASSWORD, CMD_RSA_USER_PASSCODE, CMD_RSA_NEXT_TOKEN, CMD_RSA_NEW_PIN, CMD_RSA_SYSGEN_PIN, CMD_RSA_SYSGEN_PIN_CONFIRMATION, CMD_RSA_PASSCODE, and CMD_RSA_NEW_PIN_NEXT_TOKEN.

The new authentication scheme may require a One Time Password (OTP) feature to be used (in addition to a username and password) when a specific set of protected resources is sought to be accessed. According to the OTP feature, a text (referred to as a pass code") is generated, stored in a memory, such as data store 180, and then sent to a registered/pre-configured mobile device of the user (sought to be authenticated). The user is thereafter required to enter the received pass code (as a credential) in a webpage provided by the authentication server (190). A match of the pass code entered by the user as the credential with the pass code stored in the memory is considered to be successful authentication of the user (on the assumption that the registered mobile device is accessible only to the user).

A developer accordingly implements a collection credential module (assumed to be 450) for performing the actions related to the OTP feature, in response to the command CMD_OTP. The developer also implements a custom module (assumed to be 430C) that causes invocation of collection credential module 450 when an authentication request for any one of the specific set of protected resources is received and processed.

Thus, in response to a user sending a request from client system 110A for accessing a protected resource (step 510), server system 160B sends an authentication request for the protected resource and the user to authentication server 190, in particular to access manager 420 (step 515). Access manager 420 then identifies that the new authentication scheme (implemented by custom module 430C) is to be used for authenticating the user corresponding to the requested resource, and accordingly invoked custom module 430C (step 520).

In response, custom module 430C identifies that the request resource requires an authentication of the user based on a username and password, and accordingly sends the command "CMD_USER_PASSWORD" to access manger 420 (step 520). Access manager 420, in response to the command "CMD_USER_PASSWORD" being contained in the supported set of commands (noted above), sends a web page to client system 110A (step 530), collects the user name and password credentials from the user (step 535) and forwards the collected credentials to custom module 430C (step 538).

Custom module 430C then performs an authentication of the user by checking whether the received user name and password combination exists in a non-volatile storage such as data store 180, with the existence of the combination indicating a successful authentication. After successfully authenticating the user, custom module 430C may determine that the requested resource is contained in the specific set of protected resources and accordingly requires the OTP authentication feature to be performed. Custom module 430C accordingly sends the command "CMD_OTP" to access manger 420 (step 540).

Alternatively, custom module 430C may send another command contained in the supported set of commands (such as "CMD_RSA_USER_PASSCODE") to access module 420, which then collects (and tries to authenticate the user based on) a second set of credentials corresponding to another command, similar to steps 530, 535 and 538. As noted above, the next command is sent only after the checking of the previous set of collected credentials is completed. The manner in which a new/unknown command is processed is described in detail below.

As the received command "CMD_OTP" is not contained in the supported set of commands, access manager 420 forwards the command to credential collection module 450 (step 545). In response to the command "CMD_OTP", credential collection module 450 generates and stores a pass code (associated with a user identifier) and then sends the generated pass code to the registered mobile device of the user, for example, using an SMS (short message service) gateway as is well known in the relevant arts.

Credential collection manager 450 also interfaces with user interface module 480 (step 550) and receives a corresponding custom web page (for collecting the pass code) in step 555. The received custom web page is then provided to client system 110A via access manager 420 (steps 558 and 560). Access manager 420 collects the pass code credential (step 565) and then forwards the collected pass code to custom module 430C (step 568). Custom module 430C then checks whether the received pass code (along with a user identifier determined based on the user name/password authentication) matches the previously stored pass code and user identifier, with the existence of the match indicating a successful authentication.

Custom module 430C then sends a result (success or failure) of authentication to access manager 420 (step 570), which in turn, in step 580, forwards the result to server system 160B as a response to the authentication request of step 515. Server system 160B allows the user to access (using client system 110A) the requested protected resource if the result is a successful authentication (step 590). Alternatively, if the result is a failure to authenticate the user (for example, due to non-matching of the received and stored pass codes), a web page indicating that the user is not allowed to access the requested resource is then displayed to the user on a display unit associated with client system 110A (again step 590).

Thus, a new authentication scheme (OTP feature) is implemented in authentication server 190 and an access request from a user using client system 110A for a resource hosted on server system 160B and protected the new authentication scheme. Similarly, other additional diverse authentications schemes may be implemented and integrated with authentication server 190.

It should be further appreciated that the features described above can be implemented in various embodiments as a desired combination of one or more of hardware, executable modules, and firmware. The description is continued with respect to an embodiment in which various features are operative when the instructions in the executable modules are executed.

7. Digital Processing System

Figure 6:
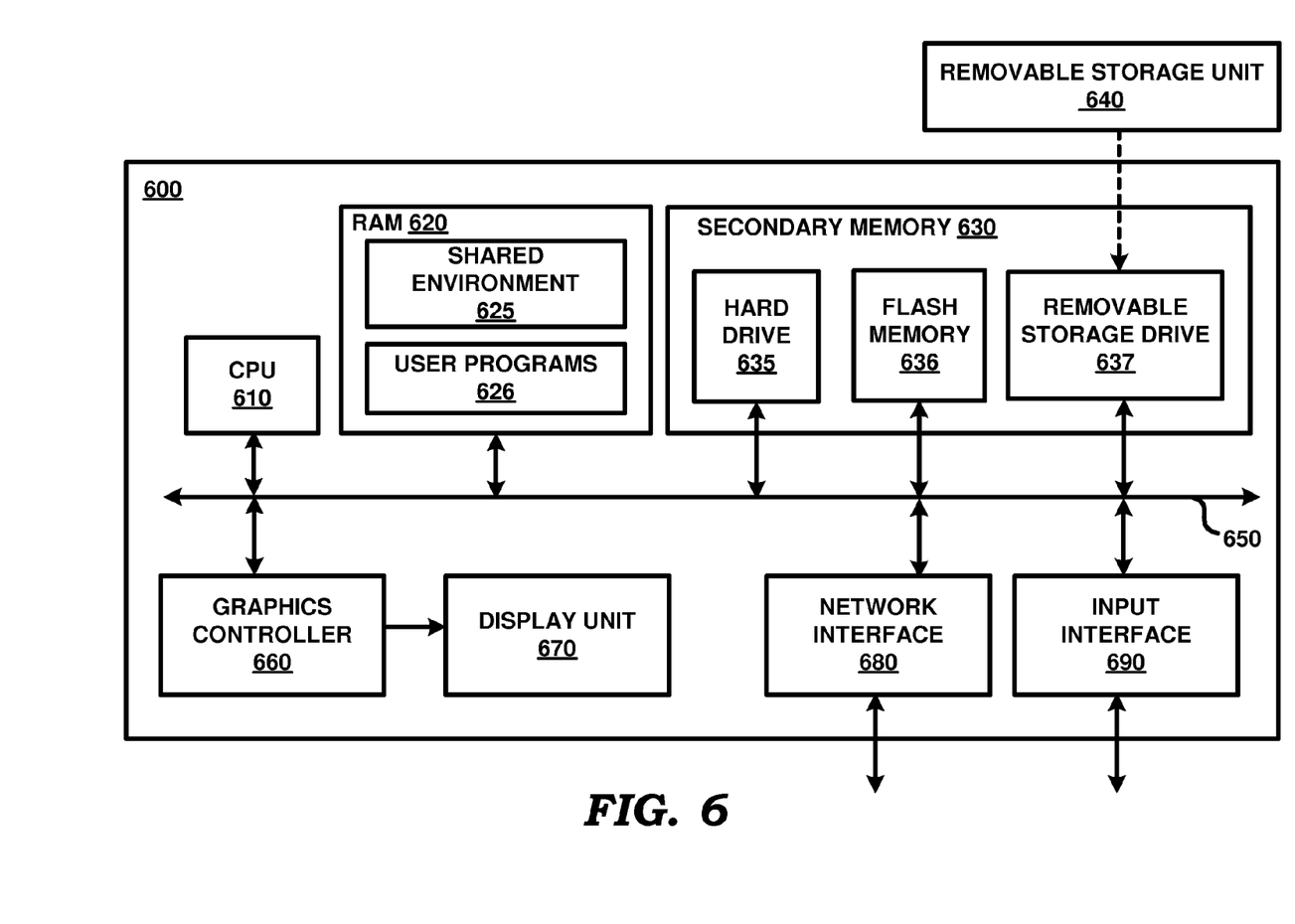
FIG. 6 is a block diagram illustrating the details of a digital processing system in which several aspects of the present invention are operative by execution of appropriate software instructions.

FIG. 6 is a block diagram illustrating the details of digital processing system 600 in which several aspects of the present invention are operative by execution of appropriate software instructions. Digital processing system 600 corresponds to authentication server 190, or any system providing the features of FIGS. 2-5 described above.

Digital processing system 600 may contain one or more processors (such as a central processing unit (CPU) 610), random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general-purpose processing unit.

RAM 620 may receive instructions from secondary memory 630 using communication path 650. RAM 620 is shown currently containing software instructions constituting shared environment 625 and/or user programs 626 (such as networking applications, database applications, etc.). Shared environment 625 contains utilities shared by user programs, and such shared utilities include operating system, device drivers, virtual machines, flow engine, etc., which provide a (common) run time environment for execution of user programs/applications.

Graphics controller 660 generates display signals (e.g., in RGB format) to display unit 670 based on data/instructions received from CPU 610. Display unit 670 contains a display screen to display the images defined by the display signals. Input interface 690 may correspond to a keyboard and a pointing device (e.g., touch-pad, mouse) that may be used to provide various inputs. Network interface 680 provides connectivity to a network (e.g., using Internet Protocol), and may be used to communicate with other connected systems (such as server systems 160A-160C or client systems 110A-110Z).

Secondary memory 630 may contain hard drive 635, flash memory 636, and removable storage drive 637. Secondary memory 630 represents a non-transitory medium, which may store the data (for example, portions of configuration data noted above) and software instructions (for example, for performing the steps of FIGS. 3 and 5), to enable digital processing system 600 to provide several features in accordance with the present invention.

Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. An authentication server comprising:
    an access manager to receive an authentication request for a user seeking access to a resource, and to identify that a first authentication scheme is to be used for authenticating said user before allowing access to said resource,
    wherein said first authentication scheme specifies that all of a first set of credentials, and a second set of credentials and a third set of credentials are to be collected and checked for processing said authentication request; and
    a custom module to send to said access manager a first command indicating said first set of credentials to be collected, wherein said custom module implements said first authentication scheme,
    said access manager, in response to receiving of said first command collecting said first set of credentials from said user, and checking, in combination with said custom module, whether said first set of credentials authenticates said user,
    said custom module to send to said access manager a second command after said checking, said second command indicating said second set of credentials to be collected,
    said access manager, in response to receiving of said second command, collecting said second set of credentials from said user and checking, in combination with said custom module, whether said second set of credentials authenticates said user,
    wherein said access manager is designed to perform said collecting and said checking in response to receiving only of a specific set of commands, wherein commands that are not included in said specific set are unknown commands, said specific set of commands including said first command and said second command,
    said custom module to send to said access manager a third command,
    said access manager to determine that said third command received from said custom module is not included in said specific set of commands and is accordingly an unknown command, wherein said access manager forwards unknown commands including said third command to a credential collection module and receives said third set of credentials from said credential collection module in response to forwarding said third command,
    wherein said access manager sends said third set of credentials to said custom module,
    wherein said authentication server operates to support unknown commands, including said third command, without having to modify a program logic of said access manager,
    wherein, in response to said first authentication scheme specifying that said first set of credentials, said second set of credentials, and said third set of credentials are to be collected and checked for processing said authentication request, said custom module sends said first command, said second command, and said third command, and said access manager, in combination with said custom module, collects and checks all of said first set of credentials, said second set of credentials, and said third set of credentials to process said authentication request.

2. The authentication server of claim 1, wherein for said checking each set of said first set of credentials, said second set of credentials and said third set of credentials, said access manager sends the corresponding set of credentials to said custom module, wherein said custom module, in response to receiving the corresponding set of credentials from said access manager, determines whether the corresponding set of credentials authenticate said user, and sends a status of authentication to said access manager, wherein said status of authentication is said second command in response to receiving said first set of credentials, said third command in response to receiving said second set of credentials, and a result of authentication in response to receiving said third set of credentials and determining that said first set of credentials, said second set of credentials and said third set of credentials together authenticate said user.

3. The authentication server of claim 1, further comprising:

a user interface module to provide a set of user interface elements for collecting said third set of credentials, wherein said credential collection module interfaces with said user interface module in response to receiving of said third command, and thereby collect said third set of credentials using said set of user interface elements.

4. The authentication server of claim 3, wherein said custom module is implemented according to a plug-in architecture, wherein said credential collection module and said user interface module are implemented within said authentication server.

5. The authentication server of claim 4, wherein said specific set of commands comprise a command for collecting a combination of user identifier and password, and a command for collecting an electronic file representing a digital certificate wherein said third command is for collecting a one time password (OTP).

6. The authentication server of claim 3, wherein said credential collection module and said user interface module are provided in a client system from which said authentication request is received, said client system being implemented external to said authentication server.

7. A non-transitory machine readable medium storing one or more sequences of instructions for causing an authentication server to authenticate users, said one of more sequences of instructions comprising:

a first set of instructions representing an access manager to receive an authentication request for a user seeking access to a resource, and to identify that a first authentication scheme is to be used for authenticating said user before allowing access to said resource, wherein said first authentication scheme specifies that all of a first set of credentials, a second set of credentials and a third set of credentials are to be collected and checked for processing said authentication request; and a second set of instructions representing a custom module implementing said first authentication scheme, said custom module to send to said access manager a first command and a second command, wherein said first command indicates that said first set of credentials is to be collected and said second command indicates that said second set of credentials is to be collected, said access manager, in response to receiving of said first command, to collect said first set of credentials from said user and to check, in combination with said custom module, whether said first set of credentials authenticates said user, said access manager, in response to receiving of said second command, to collect said second set of credentials from said user and to check, in combination with said custom module, whether said second set of credentials authenticates said user, wherein said custom module sends to said access manager said second command after said checking of said first set of credentials collected from said user, wherein said access manager is designed to perform said collecting and said checking in response to receiving only of a specific set of commands, wherein commands that are not included in said specific set are unknown commands, said specific set of commands including said first command and said second command, said custom module to send to said access manager a third command, said access manager to determine that said third command received from said custom module is not included in said specific set of commands and is accordingly an unknown command, wherein said access manager forwards unknown commands including said third command to a credential collection module and receives said third set of credentials from said credential collection module in response to forwarding said third command, wherein said access manager sends said third set of credentials to said custom module, wherein said authentication server operates to support unknown commands, including said third command, without having to modify a program logic of said access manager wherein, in response to said first authentication scheme specifying that said first set of credentials, said second set of credentials and said third set of credentials are to be collected and checked for processing said authentication request, said custom module sends said first command, said second command and said third command and said access manager collects and checks all of said first set of credentials, said second set of credentials and said third set of credentials to process said authentication request.

8. The non-transitory machine readable medium of claim 7, wherein for said checking each set of said first set of credentials, said second set of credentials and said third set of credentials, said access manager sends the corresponding set of credentials to said custom module, wherein said custom module, in response to receiving the corresponding set of credentials from said access manager, determines whether the corresponding set of credentials authenticate said user, and sends a status of authentication to said access manager, wherein said status of authentication is said second command in response to receiving said first set of credentials, said third command in response to receiving said second set of credentials, and a result of authentication in response to receiving said third set of credentials and determining that said first set of credentials, said second set of credentials and said third set of credentials together authenticate said user.

9. The non-transitory machine readable medium of claim 8, said one or more sequences of instructions further comprising:
  a third set of instructions representing a user interface module to provide a set of user interface elements for collecting said third set of credentials,
  wherein said credential collection module interfaces with said user interface module in response to receiving of said third command, and thereby collect said third set of credentials using said set of user interface elements.

10. The non-transitory machine readable medium of claim 9, wherein said custom module is implemented according to a plug-in architecture,
  wherein said credential collection module and said user interface module are implemented within said authentication server.

11. The non-transitory machine readable medium of claim 9, wherein said credential collection module and said user interface module are provided in a client system from which said authentication request is received, said client system being implemented external to said authentication server.

12. A method of authenticating users, said method being performed by an access manager in an authentication server, said method comprising:
  receiving an authentication request for a user seeking access to a resource;
  identifying a first authentication scheme to be used for authenticating said user before allowing access to said resource, wherein said first authentication scheme specifies that all of a first set of credentials, a second set of credentials and a third set of credentials are to be collected and checked for processing said authentication request;
  notifying a custom module implementing said first authentication scheme;
  receiving from said custom module, a first command indicating that said first set of credentials is to be collected;
  in response to said receiving of said first command, collecting said first set of credentials from said user and checking, in combination with said custom module, whether said first set of credentials authenticates said user;
  after said checking, receiving from said custom module, a second command indicating that said second set of credentials is to be collected;
  in response to said receiving of said second command, collecting said second set of credentials from said user and checking, in combination with said custom module, whether said second set of credentials authenticates said user,
  wherein said access manager is designed to perform said collecting and said checking in response to receiving only of a specific set of commands, wherein commands that are not included in said specific set are unknown commands, said specific set of commands including said first command and said second command;
  receiving from said custom module, a third command indicating that said third set of credentials is to be collected;
  determining that said third command is not contained in said specific set of commands and is accordingly an unknown command;
  forwarding unknown commands including said third command to a credential collection module, wherein said credential collection module is designed to collect said third set of credentials in response to said third command; and
  interfacing with said credential collection module for collecting said third set of credentials from said user and checking whether said third set of credentials authenticates said user by sending said third set of credentials to said custom module,
  wherein said authentication server operates to support unknown commands including said third command, without having to modify a program logic of said access manager,
  wherein, in response to said first authentication scheme specifying that said first set of credentials, said second set of credentials and said third set of credentials are to be collected and checked for processing said authentication request, said custom module sends said first command, said second command and said third command and
  said access manager collects and checks all of said first set of credentials, said second set of credentials and said third set of credentials to process said authentication request.

13. The method of claim 12, wherein said checking of each set of said first set of credentials, said second set of credentials and said third set of credentials is performed by said custom module, said access manager sending the corresponding set of credentials to said custom module,
  wherein said custom module, in response to receiving the corresponding set of credentials from said access manager, determines whether the corresponding set of credentials authenticate said user, and sends a status of authentication to said access manager,
  wherein said status of authentication is said second command in response to receiving said first set of credentials, said third command in response to receiving said second set of credentials, and a result of authentication in response to receiving said third set of credentials and determining that said first set of credentials, said second set of credentials and said third set of credentials together authenticate said user.

14. The method of claim 13, wherein said forwarding further comprises forwarding said third command to an user interface module designed to provide a set of user interface elements for collecting said third set of credentials,
  wherein said interfacing further comprises interfacing with said user interface module to collect said third set of credentials using said set of user interface elements.

15. The method of claim 14, wherein said credential collection module and said user interface module are provided in a client system from which said authentication request is received, said client system being implemented external to said authentication server.

16. The method of claim 14, wherein said custom module is implemented according to a plug-in architecture,
  wherein said credential collection module and said user interface module are implemented within said authentication server.

17. The method of claim 16, wherein said specific set of commands comprise a command for collecting a combination of user identifier and password, and a command for collecting an electronic file representing a digital certificate
  wherein said third command is for collecting a one time password (OTP).

* * * * *

UNITED STATES PATENT AND TRADEMARK OFFICE
CERTIFICATE OF CORRECTION

| | |
|---|---|
| PATENT NO. | : 8,806,589 B2 |
| APPLICATION NO. | : 13/526563 |
| DATED | : August 12, 2014 |
| INVENTOR(S) | : Subramanya et al. |

It is certified that error appears in the above-identified patent and that said Letters Patent is hereby corrected as shown below:

In the Claims,

In column 12, line 21, in Claim 1, after "credentials," delete "and".

Signed and Sealed this
Tenth Day of February, 2015

Michelle K. Lee
*Deputy Director of the United States Patent and Trademark Office*